United States Patent
Matsuda (10) Patent No.: US 10,694,068 B2
(45) Date of Patent: Jun. 23, 2020

(54) TERMINAL DEVICE CONFIGURED TO INITIATE PRINTING BASED ON DISTANCE FROM PRINTING DEVICE

(71) Applicant: Brother Kogyo Kabushiki Kaisha, Nagoya-shi, Aichi-ken (JP)

(72) Inventor: Munehisa Matsuda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/201,000

(22) Filed: Nov. 27, 2018

(65) Prior Publication Data

US 2019/0098167 A1 Mar. 28, 2019

Related U.S. Application Data (63) Continuation of application No. 15/715,388, filed on Sep. 26, 2017, now Pat. No. 10,148,847.

(30) Foreign Application Priority Data

Nov. 28, 2016 (JP) ................. 2016-230536

(51) Int. Cl.
*G06F 3/12* (2006.01)
*H04N 1/32* (2006.01)
(Continued)

(52) U.S. Cl.
CPC .......... *H04N 1/32112* (2013.01); *G06F 3/12* (2013.01); *G06F 3/1204* (2013.01); *G06F 3/126* (2013.01);
(Continued)

(58) Field of Classification Search
CPC .......... H04N 1/32112; H04N 1/32053; H04N 2201/0013; H04N 2201/0094;
(Continued)

(56) References Cited

U.S. PATENT DOCUMENTS

2013/0141755 A1* 6/2013 Miller .................. G06F 3/1204
358/1.15
2016/0239244 A1 8/2016 Kanakubo
2017/0097797 A1* 4/2017 Yasuno ................. G06F 3/1222

FOREIGN PATENT DOCUMENTS

JP H11-045034 A 2/1999
JP 2016-151950 A 8/2016

* cited by examiner

*Primary Examiner* — Kent Yip
(74) *Attorney, Agent, or Firm* — Banner & Witcoff, Ltd.

(57) ABSTRACT

A terminal device performs operations includes: a file information receiving process to receive M pieces of file information for identifying M image files from a printer storing M image files; a specific signal receiving process to receive a specific signal from the printer; a determination process to determine whether an inter-device distance is equal to or less than a predetermined distance by using a received radio field intensity of the specific signal; a selection process to select N pieces of file information, which is a part of the M pieces of file information when it is determined in the determination process that the inter-device distance is equal to or less than the predetermined distance; and a print instruction transmission process to not transmit the print instruction to the printer when it is determined that the inter-device distance is not equal to or less than the predetermined distance.

18 Claims, 9 Drawing Sheets

(51) Int. Cl.
*H04W 4/80* (2018.01)
*H04W 4/02* (2018.01)
*H04W 84/12* (2009.01)

(52) U.S. Cl.
CPC .......... *G06F 3/1222* (2013.01); *G06F 3/1292* (2013.01); *H04N 1/32053* (2013.01); *H04W 4/02* (2013.01); *H04W 4/80* (2018.02); *H04N 2201/0013* (2013.01); *H04N 2201/0094* (2013.01); *H04N 2201/3278* (2013.01); *H04W 84/12* (2013.01)

(58) Field of Classification Search
CPC . H04N 2201/3278; G06F 3/12; G06F 3/1292; G06F 3/126; G06F 3/1222; G06F 3/1204; H04W 4/02; H04W 4/80; H04W 84/12
See application file for complete search history.

TERMINAL DEVICE CONFIGURED TO INITIATE PRINTING BASED ON DISTANCE FROM PRINTING DEVICE

CROSS-REFERENCE TO RELATED APPLICATION

This application is a continuation of U.S. patent application Ser. No. 15/715,388 filed Sep. 26, 2017, which claims priority from Japanese Patent Application No. 2016-230536 filed on Nov. 28, 2016, the entire subject matter of which are incorporated herein by reference.

TECHNICAL FIELD

The present specification discloses a terminal device that transmits a print instruction to a printer and causes the printer to perform printing according to an image file.

BACKGROUND

The background art discloses a printing system including a mobile terminal, a host computer, and a printer. The printer receives a print file to be printed from the host computer and stores the print file. The mobile terminal receives identification information of the printer from the host computer and stores the identification information. When an advertise packet including the identification information of the printer is received from the printer, the mobile terminal determines that the stored identification information coincides with identification information of the advertise packet, according to Bluetooth (registered trademark) Low Energy (BLE). In this case, the mobile terminal calculates a distance between the mobile terminal and the printer on the basis of an output radio field intensity value included in the advertise packet. When the calculated distance is smaller than a predetermined distance, the mobile terminal transmits a print instruction to the printer.

SUMMARY

The background art does not consider the situation in which the printer stores a plurality of print files and does not disclose that the printer is allowed to perform printing according to some of the plurality of print files.

The present specification discloses a technology in which a terminal device causes a printer to perform printing according to some of a plurality of image files stored in the printer.

A terminal device of this disclosure includes: memory storing instructions, and a processor, when executing the instructions stored in the memory, perform operations comprising: a file information receiving process to receive M pieces of file information for identifying M image files from a printer storing M image files, M being an integer equal to or more than two; a specific signal receiving process to receive a specific signal from the printer; a determination process to determine whether an inter-device distance, which is a distance between the terminal device and the printer, is equal to or less than a predetermined distance by using a received radio field intensity of the specific signal; a selection process to select N pieces of file information, which is a part of the M pieces of file information, among the received M pieces of file information when it is determined in the determination process that the inter-device distance is equal to or less than the predetermined distance, N being an integer equal to or more than 1 and smaller than M; and a print instruction transmission process to transmit, to the printer, a print instruction for causing the printer to perform printing according to N image files identified by the selected N pieces of file information among the M image files, when it is determined in the determination process that the inter-device distance is equal to or less than the predetermined distance; and not transmit the print instruction to the printer when it is determined in the determination process that the inter-device distance is not equal to or less than the predetermined distance.

According to the above configuration, when the distance between the printer storing the M image files and the terminal device is equal to or less than the predetermined distance, the terminal device selects the N pieces of file information which is a part of the M pieces of file information and transmits the print instruction for causing the printer to perform the printing according to the N image files. In this way, the terminal device can allow the printer to perform the printing according to the N image files which is a part of the M image files.

A control method for implementing the terminal device, a computer program, and a computer readable recording medium storing the computer program are also newly useful. Furthermore, a communication system including the terminal device and the printer is also newly useful.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Example (Configuration of Communication System)

Figure 1:
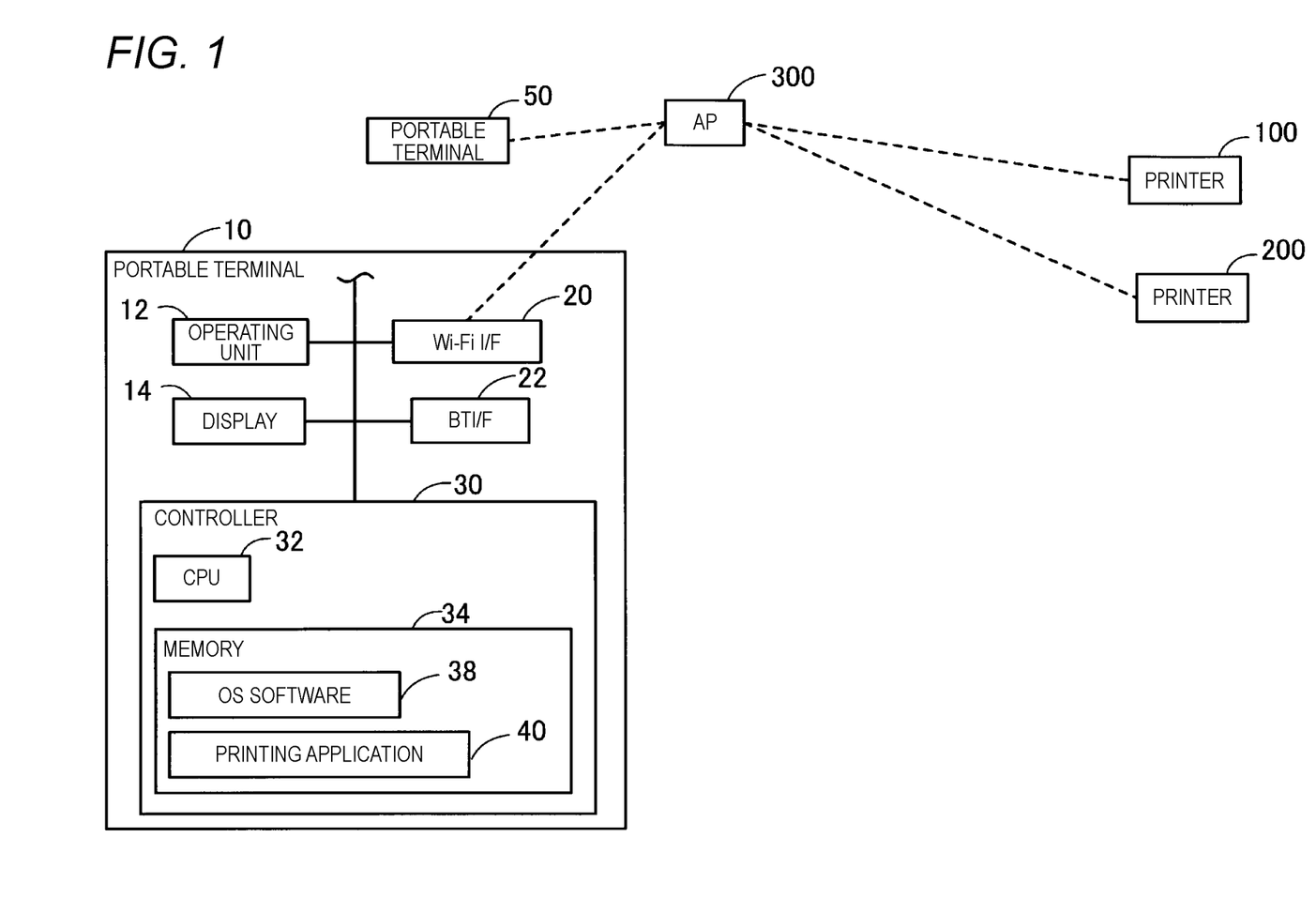
FIG. 1 illustrates a configuration of a communication system.

As illustrated in FIG. 1, a communication system includes a plurality of portable terminals 10 and 50, a plurality of printers 100 and 200, and an access point (AP) 300. Each of the devices 10, 50, 100, and 200 can perform radio communication (hereinafter, referred to as "Wi-Fi communication") according to a Wi-Fi system via the AP 300. Each of the devices 10, 50, 100, and 200 can perform radio communication (hereinafter, referred to as "BT communication") according to a Bluetooth system.

(Configuration of Portable Terminals 10 and 50)

The portable terminal 10 and the portable terminal 50 have the same configuration. Hereinafter, the configuration of the portable terminal 10 will be described and a description of the configuration of the portable terminal 50 will be omitted.

Examples of the portable terminal 10 includes a portable terminal device such as a mobile phone (for example, a smart phone), a PDA, a note PC, a tablet PC, a portable music reproducing apparatus, and a portable moving picture reproducing apparatus. The portable terminal 10 includes an operating unit 12, a display 14, a Wi-Fi interface 20, a BT (Bluetooth) interface 22, and a controller 30. Each of the units 12 to 30 is connected to a bus line (the reference numeral is not illustrated). Hereinafter, the interface is referred to as an "I/F".

The operating unit 12 includes a plurality of keys. A user can operate the operating unit 12, thereby inputting various instructions to the portable terminal 10. The display 14 displays various types of information. The display 14 also serves as so-called a touch panel (that is, also serves as an operating unit).

The Wi-Fi I/F 20 is an I/F for performing the Wi-Fi communication. The Wi-Fi system is, for example, a radio communication system based on a 802.11 standard of IEEE (Institute of Electrical and Electronics Engineers, Inc) and standards (for example, 802.11a, 11b, 11g, 11n and the like) conforming to the 802.11 standard.

The BT I/F 22 is an I/F for performing the BT communication. The Bluetooth system is, for example, a radio communication system based on a 802.15.1 standard of IEEE and standards conforming to the 802.15.1 standard. More specifically, the BT I/F 22 supports BLE (Bluetooth (registered trademark) Low Energy).

The difference of the Wi-Fi system and the BT system will be described. The communication speed (for example, a maximum communication speed is 600 [Mbps]) of the Wi-Fi communication is faster than the communication speed (for example, a maximum communication speed is 24 [Mbps]) of the BT communication. The frequency of a carrier in the Wi-Fi communication is a 2.4 [GHz] band or a 5.0 [GHz] band. The frequency of a carrier in the BT communication is a 2.4 [GHz] band. That is, when the 5.0 [GHz] band is employed as the frequency of the carrier in the Wi-Fi communication, the frequency of the carrier in the Wi-Fi communication and the frequency of the carrier in the BT communication are different from each other. Furthermore, a maximum distance (for example, about 100 [m]), in which the Wi-Fi communication can be performed, is larger than a maximum distance (for example, about several tens of [m]), in which the BT communication can be performed.

The controller 30 includes a CPU 32 and a memory 34. The CPU 32 performs various processes according to programs 38 and 40 stored in the memory 34. The memory 34 is configured by a volatile memory, a nonvolatile memory and the like. The memory 34 stores a printing application (hereinafter, referred to as "printing app") 40 as well as the OS software 38 for implementing basic operations of the portable terminal 10. The printing app 40 is an application for causing each of the printers 100 and 200 to perform a printing function. The printing app 40, for example, may be installed in the portable terminal 10 from a server on the Internet provided by a bender of each of the printers 100 and 200, or may be installed in the portable terminal 10 from media shipped together with each of the printers 100 and 200.

(Configuration of Printers 100 and 200)

Each of the printers 100 and 200 is a peripheral device capable of performing the printing function, that is, a peripheral device such as the portable terminal 10. Each of the printers 100 and 200 can perform the Wi-Fi communication and the BT communication. Particularly, each of the printers 100 and 200 supports the BLE.

Figure 2:
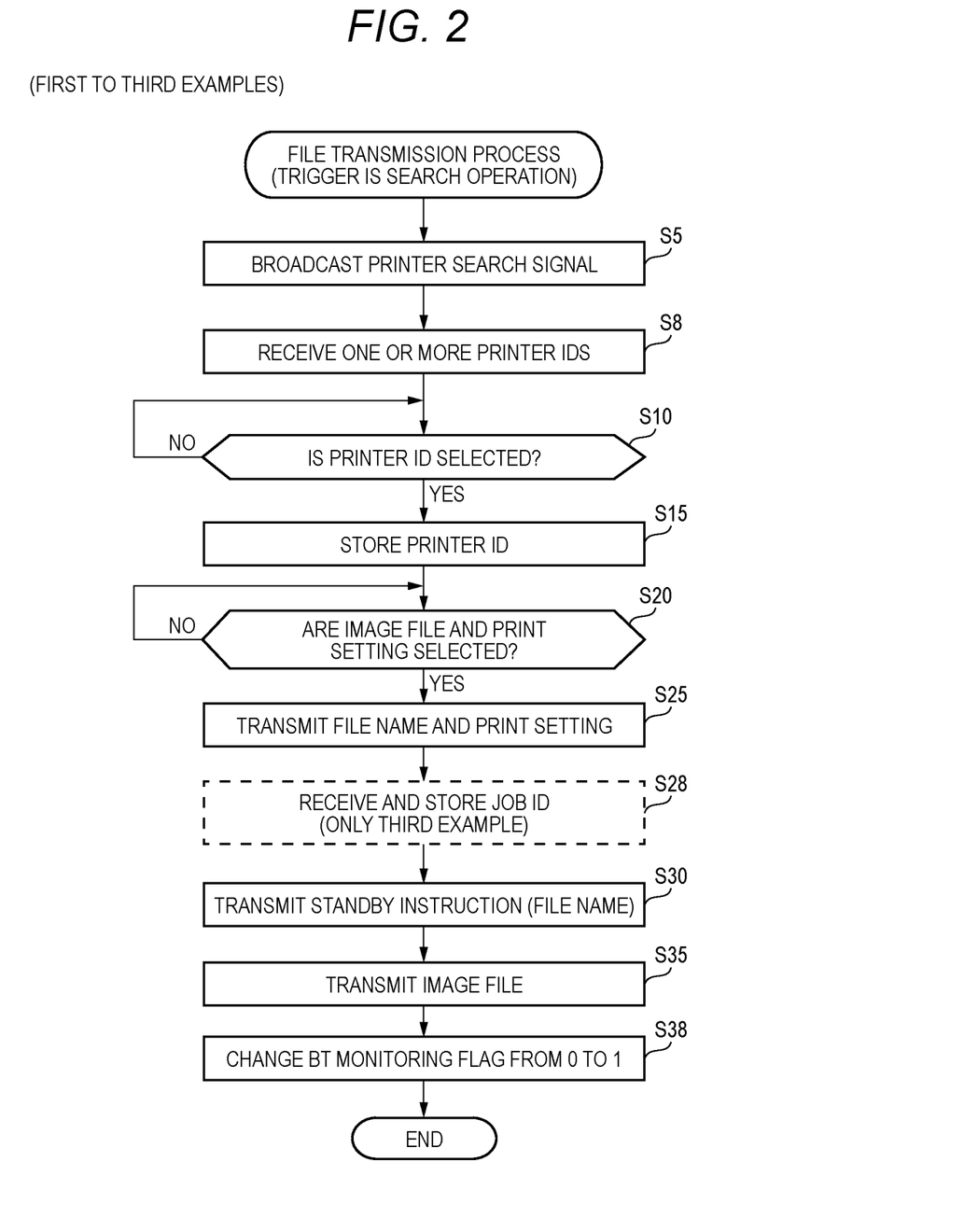
FIG. 2 illustrates a flowchart of a file transmission process of first to third examples.

(File Transmission Procedure of Portable Terminal 10; FIG. 2)

With reference to FIG. 2, the content of a file transmission procedure, which is performed by the CPU 32 of the portable terminal 10 according to the printing app 40, will be described. The CPU 32 employs, as a trigger, the execution by a user of a starting operation for starting the printing app 40 and a search operation for searching for one or more printers belonging to a Wi-Fi-based network (hereinafter, referred to as "Wi-Fi NW") to which the portable terminal 10 belongs, thereby starting the procedure of FIG. 2.

In S5, the CPU 32 transmits a printer search signal for searching for a printer via the Wi-Fi I/F 20 in a broadcast manner.

In S8, the CPU 32 receives one or more printer IDs for identifying the printers from each of the one or more printers 100 and 200 belonging to the Wi-Fi NW via the Wi-Fi I/F 20. The CPU 32 causes the display 14 to display a printer selection screen including the received one or more printer IDs. The printer selection screen is a screen for causing a user to select a printer ID of a printer"" which should perform printing (hereinafter, referred to as a "target printer").

In S10, the CPU 32 monitors whether one printer ID is selected by a user. When the one printer ID is selected, the CPU 32 determines that the determination result is YES in S10 and causes the memory 34 to store the selected printer ID in S15.

In S20, the CPU 32 monitors whether one image file, which indicates an image to be printed among one or more image files stored in the memory 34, and print setting for printing according to the image file are selected by a user. Examples of the print setting include a size of a printing paper (that is, a paper size), the presence or absence of execution of duplex printing, a color number (that is, monochrome printing and color printing) and the like. When the image file and the print setting are selected (YES in S20), the CPU 32 proceeds to S25. Hereinafter, the image file selected in S20 is called a "target image file".

In S25, the CPU 32 transmits a file name of the target image file and the print setting selected in S20 to the target printer via the Wi-Fi I/F 20.

In S30, the CPU 32 transmits a standby instruction including the file name of the target image file to the target printer via the Wi-Fi I/F 20. The standby instruction is an instruction for delaying execution of printing according to the target image file. In this way, even though the target image file is transmitted to the target printer, printing according to the target image file is not performed so long as a print instruction (S70 of FIG. 3), which will be described later, is not transmitted to the target printer.

In S35, the CPU 32 transmits the target image file to the printer via the Wi-Fi I/F 20.

In S38, the CPU 32 changes a BT monitoring flag (not illustrated) of the memory 34 from "0" to "1". The BT monitoring flag "0" indicates that a print instruction procedure of FIG. 3 to be described later is not performed, and the BT monitoring flag "1" indicates that the print instruction procedure is performed. After S38 is ended, when a user performs an end operation for ending the printing app 40, the procedure of FIG. 2 is ended. In the case of desiring that a plurality of image files are continuously transmitted to the same target printer, a user can further select the image file and the print setting without performing the end operation (S20). That is, after S38 is ended, when the end operation is not performed, the CPU 32 skips S5 to S15 and proceeds to S20.

As described above, the target image file, the file name, and the print setting are transmitted to the target printer from the portable terminal 10 (S25 and S35). In this case, the target printer stores a print job in which a job ID for identifying the print job, the target image file, the file name, and the print setting are associated with each other.

Figure 3:
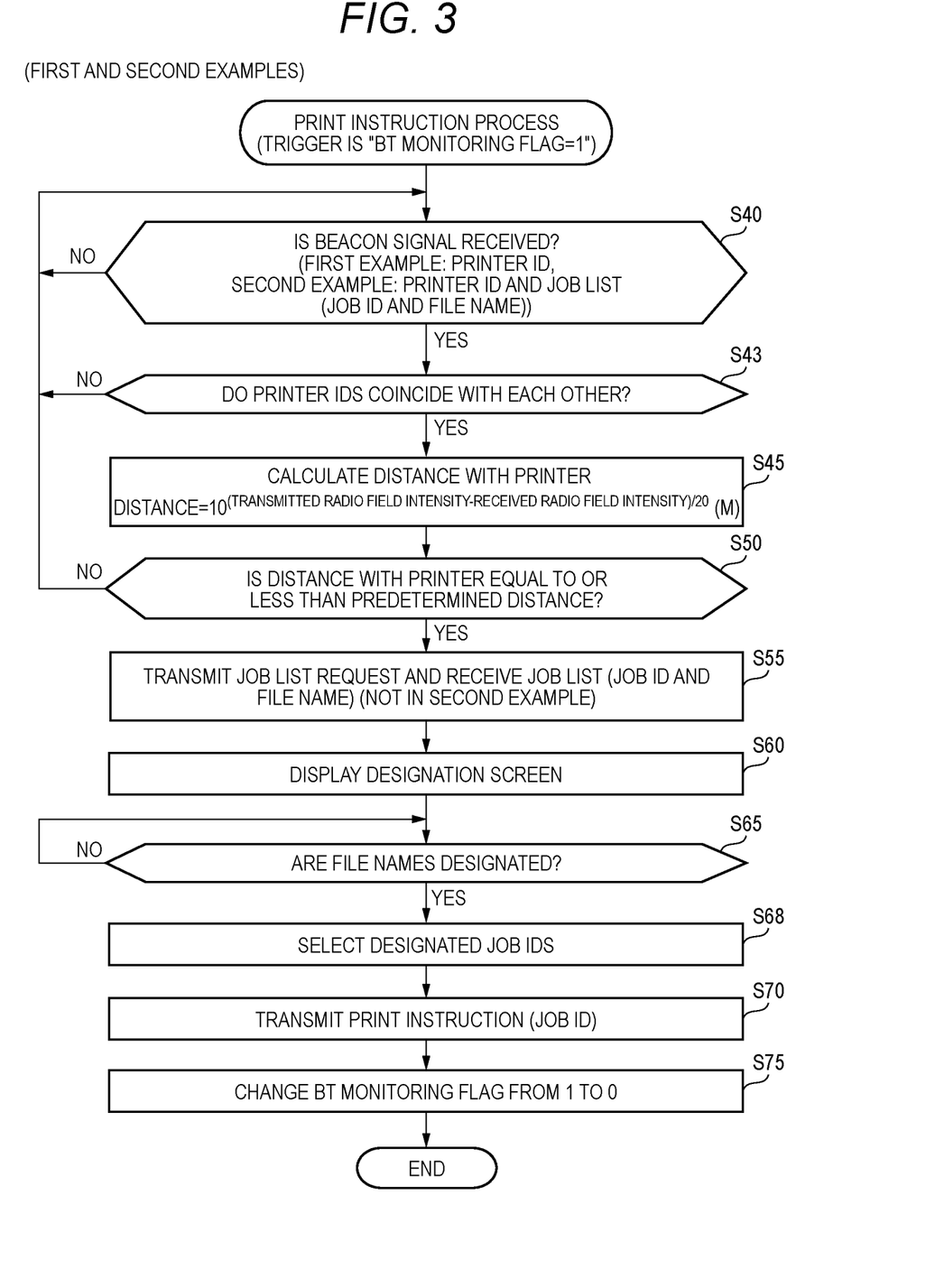
FIG. 3 illustrates a flowchart of a print instruction process of the first and second examples.

(Print Instruction Procedure of Portable Terminal 10; FIG. 3)

Subsequently, with reference to FIG. 3, the content of the print instruction procedure, which is performed by the CPU 32 of the portable terminal 10 according to the printing app 40, will be described. The CPU 32 employs, as a trigger, the change of the BT monitoring flag to "1" in S38 of FIG. 2, thereby performing the procedure of FIG. 3.

In S40, the CPU 32 monitors whether a beacon signal is received from a printer via the BT I/F 22. The beacon signal includes a printer ID of the printer which is a transmission source of the signal. When the beacon signal is received, the CPU 32 determines that the determination result is YES in S40 and proceeds to S43. In the state where the BT monitoring flag is "0", the CPU 32 does not perform the process of FIG. 3. That is, in the state where the BT monitoring flag is "0", even though the Beacon signal is received from the printer via the BT I/F 22, the CPU 32 does not perform processes after S43, so that it is possible to reduce a processing load.

In S43, the CPU 32 determines whether the printer ID of the received Beacon signal coincides with the printer ID in the memory 34 stored in S15 of FIG. 2. When it is determined that the two printer IDs coincide with each other (YES in S43), the CPU 32 proceeds to S45. In this case, the printer, which is the transmission source of the received Beacon signal, is a target printer. On the other hand, when it is determined that the two printer IDs do not coincide with each other (NO in S43), the CPU 32 returns to S40. In this case, since the printer, which is the transmission source of the received Beacon signal, is a printer different from the target printer, the CPU 32 does not perform processes after S45, so that it is possible to reduce a processing load.

In S45, the CPU 32 calculates a distance between the portable terminal 10 and the target printer. Specifically, firstly, the CPU 32 specifies a transmitted radio field intensity written in the Beacon signal. The transmitted radio field intensity is a radio field intensity of a carrier at the time of transmission of the Beacon signal. More specifically, the transmitted radio field intensity is equal to the received radio field intensity of a carrier measured at a point separated from the target printer, which is the transmission source of the Beacon signal, by 1 m. The vender of each of the printers 100 and 200 has measured in advance the received radio field intensity of a carrier measured at a point separated from each of the printers 100 and 200 by 1 m, and has adjusted each of the printers 100 and 200 such that the measured received radio field intensity is written in the Beacon signal as the transmitted radio field intensity. Next, the CPU 32 acquires a received radio field intensity, which is the radio field intensity of a carrier at the time of reception of the Beacon signal, from the BT I/F 22. Then, the CPU 32 puts the specified transmitted radio field intensity and the acquired received radio field intensity into a formula shown in S45, thereby calculating the distance between the portable terminal 10 and the target printer.

In S50, the CPU 32 determines whether the calculated distance is equal to or less than a predetermined distance. When it is determined that the calculated distance is equal to or less than the predetermined distance (YES in S50), the CPU 32 proceeds to S55. When it is determined that the calculated distance is not equal to or less than the predetermined distance (NO in S50), the CPU 32 returns to S40 without performing processes after S55. In the present embodiment, the predetermined distance of S50 is a distance (for example, 0.5 m) sufficiently smaller than a maximum distance in which the BT communication can be performed. In this way, when the distance between a user of the portable terminal 10 and the target printer is larger than the predetermined distance (that is, when the user is not able to quickly collect printed matters from the target printer), it is possible to suppress printing from being performed in the target printer. It is possible to suppress persons, other than the user, from seeing or carrying away printed matters for the user.

In S55, the CPU 32 transmits a job list request for requesting a job list to the target printer via the Wi-Fi I/F 20. In this way, the CPU 32 receives the job list from the target printer via the Wi-Fi I/F 20. The job list includes one or more pieces of correspondence information related to one or more print jobs stored in the target printer. The correspondence information is information with which job IDs and file names correlate with each other. Particularly, in the process of FIG. 2, when a plurality of target image files are transmitted to the target printer, the job list includes a plurality of pieces of correspondence information related to a plurality of print jobs. As described above, the CPU 32 receives the Beacon signal from the target printer (YES in S40) and then transmits the job list request. That is, when it is separated from the target printer such that it is not possible to perform the BT communication, that is, when a user does not desire printing in the target printer, the CPU 32 does not transmit the job list request. Therefore, it is possible to suppress wasteful communication from being performed. After it is determined that the distance between the portable terminal 10 and the target printer is equal to or less than the predetermined distance (YES in S50), the CPU 32 transmits the job list request. That is, when the distance between the portable terminal 10 and the target printer is larger than the predetermined distance, that is, when the user does not desire printing in the target printer, the CPU 32 does not transmit the job list request. Therefore, it is possible to suppress wasteful communication from being performed.

In S60, the CPU 32 causes the display 14 to display a designation screen including one or more file names included in the received job list. The designation screen is a screen for receiving a designation operation for designating one or more image files, which are desired to be printed by a user, among the one or more image files identified by the one or more file names.

In S65, the CPU 32 monitors whether the one or more file names are designated when the designation operation is performed by a user. When the one or more file names are designated, the CPU 32 determines that the determination result is YES in S65 and proceeds to S68.

In S68, the CPU 32 selects one or more job IDs correlated to the designated one or more file names by using the one or more pieces of correspondence information included in the received job list.

In S70, the CPU 32 transmits a print instruction including the selected one or more job IDs to the target printer via the Wi-Fi I/F 20. The print instruction is an instruction for causing the target printer to perform printing according to the one or more image files identified by the selected one or more job IDs.

In S75, the CPU 32 changes the BT monitoring flag of the memory 34 from "1" to "0". When S75 is ended, the process of FIG. 3 is ended. Until the BT monitoring flag in S38 of FIG. 2 is changed to "1" again, the process of FIG. 3 is not performed.

Figure 4:
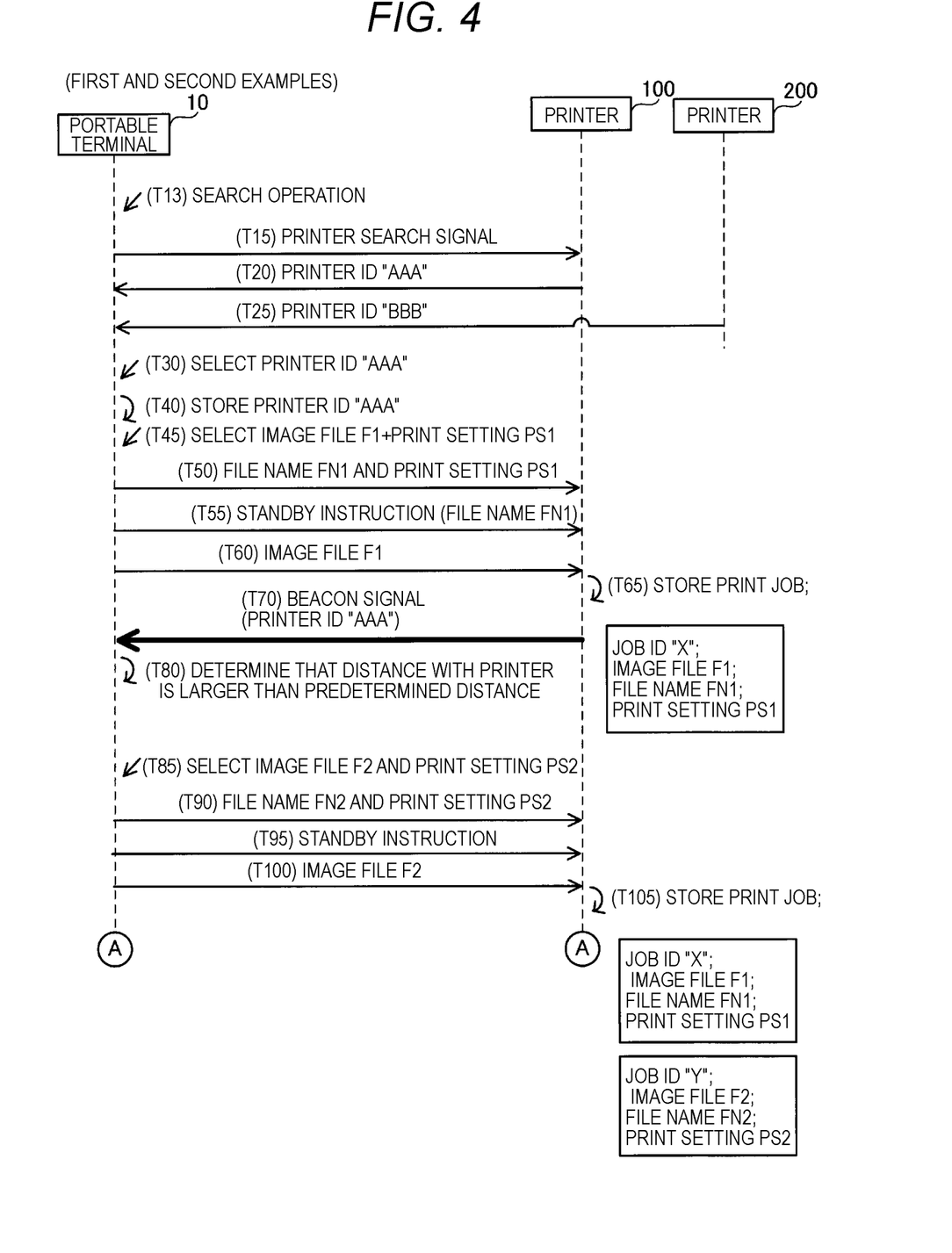
FIG. 4 illustrates a sequence diagram of the first and second examples.

(Detailed Case; FIG. 4)

Subsequently, with reference to FIG. 4, detailed cases implemented by the processes of FIGS. 2 and 3 will be described. In FIG. 4, Wi-Fi communication and BT communication, which are performed between the portable terminal 10 and each of the printers 100 and 200, are indicated by thin line arrows and a thick line arrow, respectively.

In T13, a user starts the printing app 40 to perform the search operation (the trigger of the process of FIG. 2). In T15, the portable terminal 10 transmits the printer search signal in a broadcast manner (S5).

The portable terminal 10 receives a printer ID "AAA" of the printer 100 from the printer 100 in T20, and receives a printer ID "BBB" of the printer 200 from the printer 200 in T25 (S8). Then, the portable terminal 10 displays the printer selection screen. In T30, a user selects the printer ID "AAA" on the printer selection screen (YES in S10). Then, in T40, the portable terminal 10 stores the selected printer ID "AAA" (S15).

In T45, the user selects an image file F1 and print setting PS1 (YES in S20). In this case, the portable terminal 10 transmits a file name FN1 of the image file F1 and the print setting PS1 to the printer 100 in T50 (S25), transmits a standby instruction including the file name FN1 to the printer 100 in T55 (S30), and transmits the image file F1 to the printer 100 in T60 (S35).

Although not illustrated, when the file name FN1 and the print setting PS1 in T50 are received from the portable terminal 10, the printer 100 generates a job ID X. Then, when the image file F1 in T60 is received from the portable terminal 10, the printer 100 stores a print job in which the job ID "X", the image file F1, the file name FN1, and the print setting PS1 are associated with each other in T65. Furthermore, the printer 100 repeatedly transmits a Beacon signal including the printer ID "AAA" of the printer 100 itself as a condition of storing the print job.

In T70, the portable terminal 10 receives the Beacon signal including the printer ID "AAA" from the printer 100 (YES in S40 of FIG. 3), and determines that the printer ID "AAA" of the Beacon signal coincides with the printer ID "AAA" stored in T40 (YES in S43). Then, in T80, the portable terminal 10 calculates the distance between the portable terminal 10 and the printer 100 by using the transmitted radio field intensity and the received radio field intensity of the Beacon signal, and determines that the calculated distance is not equal to or less than the predetermined distance (NO in S50). In this case, the portable terminal 10 does not transmit a print instruction to the printer 100. In this way, it is possible to suppress persons, other than the user of the portable terminal 10, from seeing or carrying away printed matters for the user.

In T85, the user further selects an image file F2 and print setting PS2 (YES in S20 of FIG. 2). In this case, the portable terminal 10 transmits a file name FN2 for identifying the image file F2 and the print setting PS2 to the printer 100 in T90 (S25), transmits a standby instruction including the file name FN2 to the printer 100 in T95 (S30), and transmits the image file F2 to the printer 100 in T100 (S35).

In T105, the printer 100 stores a print job in which a job ID "Y" for identifying the image file F2, the image file F2, the file name FN2, and the print setting PS2 are associated with each other. That is, two print jobs are stored in the printer 100. Thereafter, the user of the portable terminal 10 approaches the printer 100 with the portable terminal 10.

Figure 5:
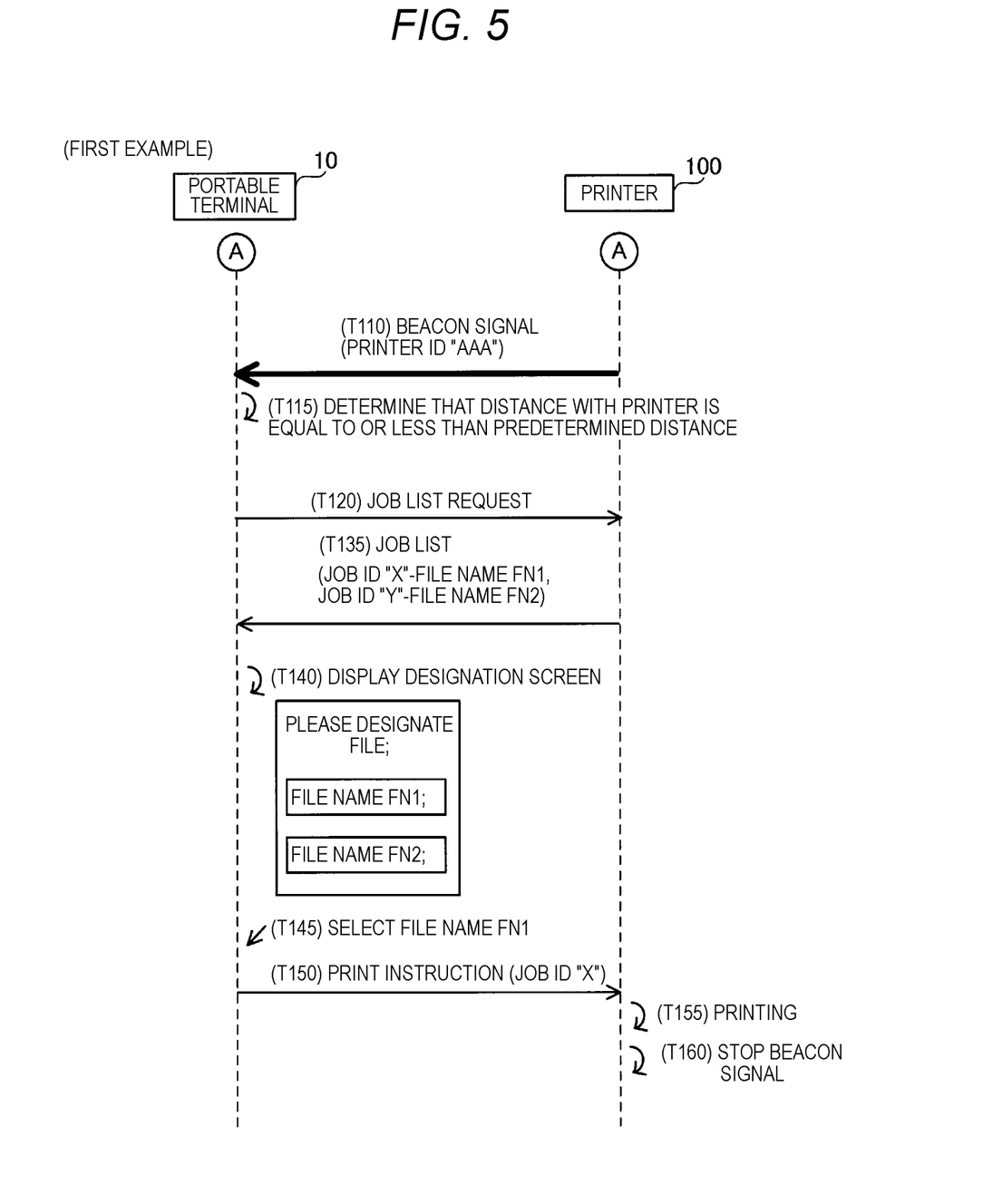
FIG. 5 illustrates a subsequent sequence diagram of FIG. 4 of the first example.

As illustrated in FIG. 5, the portable terminal 10 receives the Beacon signal including the printer ID "AAA" from the printer 100 in T110 (YES in S40 and YES in S43 of FIG. 3), and determines that the distance between the portable terminal 10 and the printer 100 is equal to or less than the predetermined distance in T115 (YES in S50). In this case, the portable terminal 10 transmits the job list request to the printer 100 in T120 and receives the job list from the printer 100 in T135 (S55). The job list includes correspondence information in which the job ID "X" and the file name FN1 are associated with each other, and correspondence information in which the job ID "Y" and the file name FN2 are associated with each other.

In T140, the portable terminal 10 displays the designation screen (S60). In T145, a user selects the file name FN1 on the designation screen (YES in S65). In this case, in T150, the portable terminal 10 selects the job ID "X" associated with the selected file name FN1 from the job list (S68), and transmits the print instruction including the selected job ID "X" to the printer 100 (S70).

In T155, the printer 100 performs printing according to the image file F1 associated with the job ID "X" by using the print setting PS1 associated with the job ID "X" included in the print instruction. In T160, the printer 100 stops transmitting the Beacon signal.

Effect of Present Example

According to the present example, when the distance between the printer 100 storing the two image files F1 and F2 and the portable terminal 10 is equal to or less than the predetermined distance (T115 of FIG. 5), the portable terminal 10 selects the one image file F1 from the two image files F1 and F2 (T145) according to the designation operation of the user and transmits a print instruction for causing the printer 100 to perform printing according to the selected image file F1 (T150). In this way, the portable terminal 10 can allow the printer 100 to perform printing according to the image file F1, which is desired to be printed by a user, of the two image files F1 and F2 (T155).

(Correspondence Relation)

The portable terminal 10 and the printer 100 are examples of a "terminal device" and a "printer". The image files F1 and F2 are one example of M image files. The job IDs "X" and "Y" are one example of "M pieces of file information". The Beacon signal is one example of a "specific signal". The distance between the portable terminal 10 and the printer is one example of a "target value". The printer ID "AAA" and the job list request are one example of "printer information" and an "information request", respectively. The image file F1 is one example of "N image files". The Wi-Fi I/F 20 and the BT I/F 22 are one example of a "first communication interface" and a "second communication interface", respectively.

Second Example

Differences with the first example will be described. In the present example, the job list is included in the Beacon signal.

(File Transmission Process of Portable Terminal 10; FIG. 2)

The CPU 32 of the portable terminal 10 performs each process of FIG. 2 similarly to the first example. In this way, the CPU 32 changes the BT monitoring flag of the memory 34 from "0" to "1" (S38).

(Print Instruction Process of Portable Terminal 10; FIG. 3)

In S40, the CPU 32 monitors whether the Beacon signal including the printer ID and the job list is received from a printer. S43 to S50 are similar to S43 to S50 of the first example. In the present example, since the job list is included in the received Beacon signal, the CPU 32 skips S55. S60 to S75 are similar to S60 to S75 of the first example.

Figure 6:
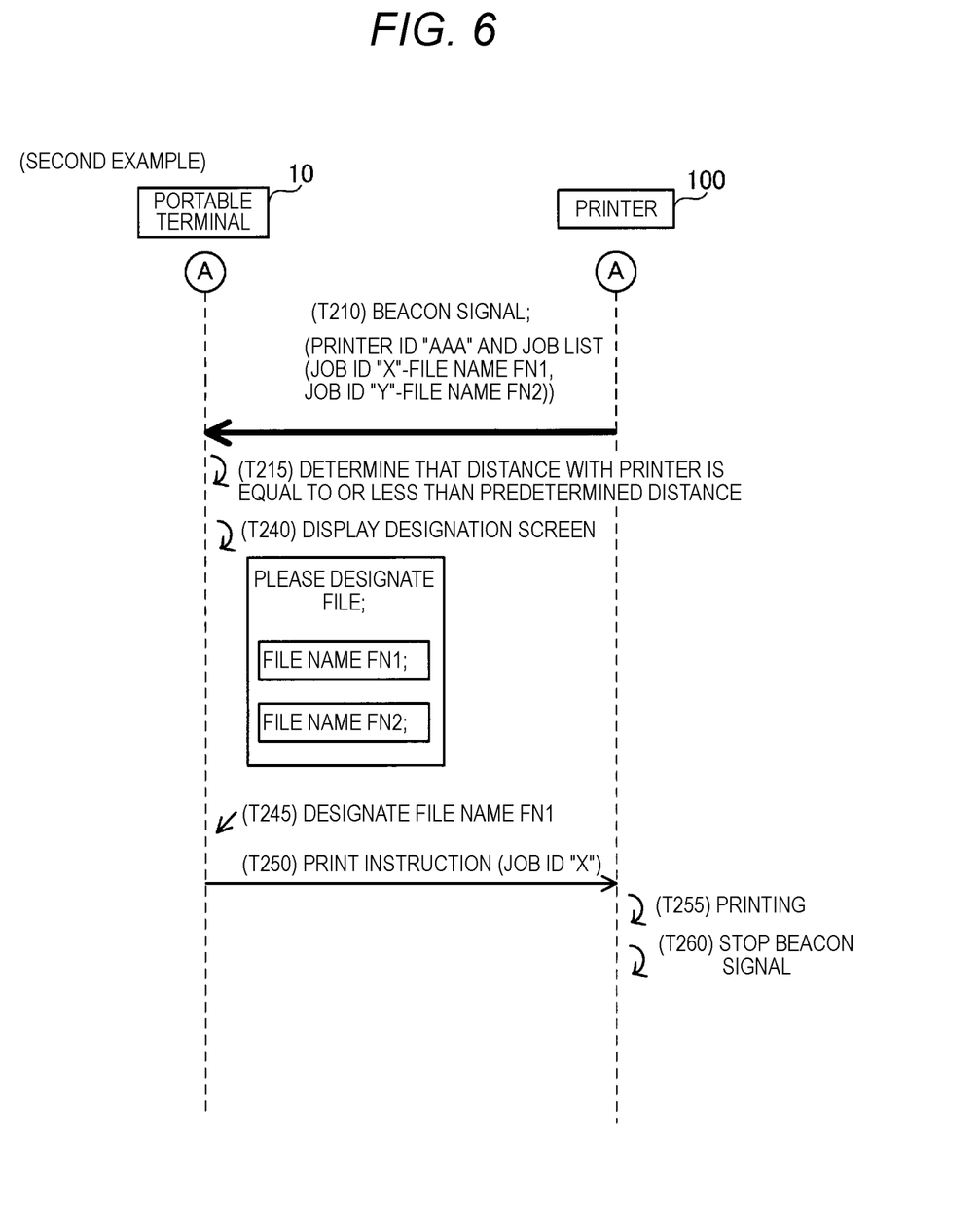
FIG. 6 illustrates a subsequent sequence diagram of FIG. 4 of the second example.

(Detailed Case; FIG. 6)

In the present example, after the process of FIG. 4 is performed similarly to the first example, each device performs the process of FIG. 6 instead of the process of FIG. 5. In T210, the portable terminal 10 receives the Beacon signal including the printer ID "AAA" and the job list from the printer 100 (YES in S40 of FIG. 3). T215 to T260 are similar to T115 to T160 of FIG. 5.

Effect of Present Example

Also in the present example, the portable terminal 10 can allow the printer 100 to perform printing according to the image file F1 which is a part of the two image files F1 and F2 and is desired to be printed by a user. Furthermore, in the present example, since the Beacon signal of T210 includes the job list, the portable terminal 10 receives the Beacon signal, determines that the distance with the printer 100 is equal to or less than the predetermined distance, and then transmits no job list request. In this way, the portable terminal 10 can quickly display the designation screen after determining that the distance between the portable terminal 10 and the printer 100 is equal to or less than the predetermined distance, and can reduce a communication load.

Third Example

Differences with the first example will be described. In the present example, the portable terminal 10 selects only an image file, which is transmitted to and stored in a target printer by the portable terminal 10, among a plurality of image files stored in the target printer.

(File Transmission Process of Portable Terminal 10; FIG. 2)

S5 to S25 are similar to S5 to S25 of the first example. In S28, the CPU 32 of the portable terminal 10 receives a job ID, in which the file name and the print setting transmitted in S25 are associated with each other, from the target printer, and stores the job ID in the memory 34. S30 to S38 are similar to S30 to S38 of the first example.

Figure 7:
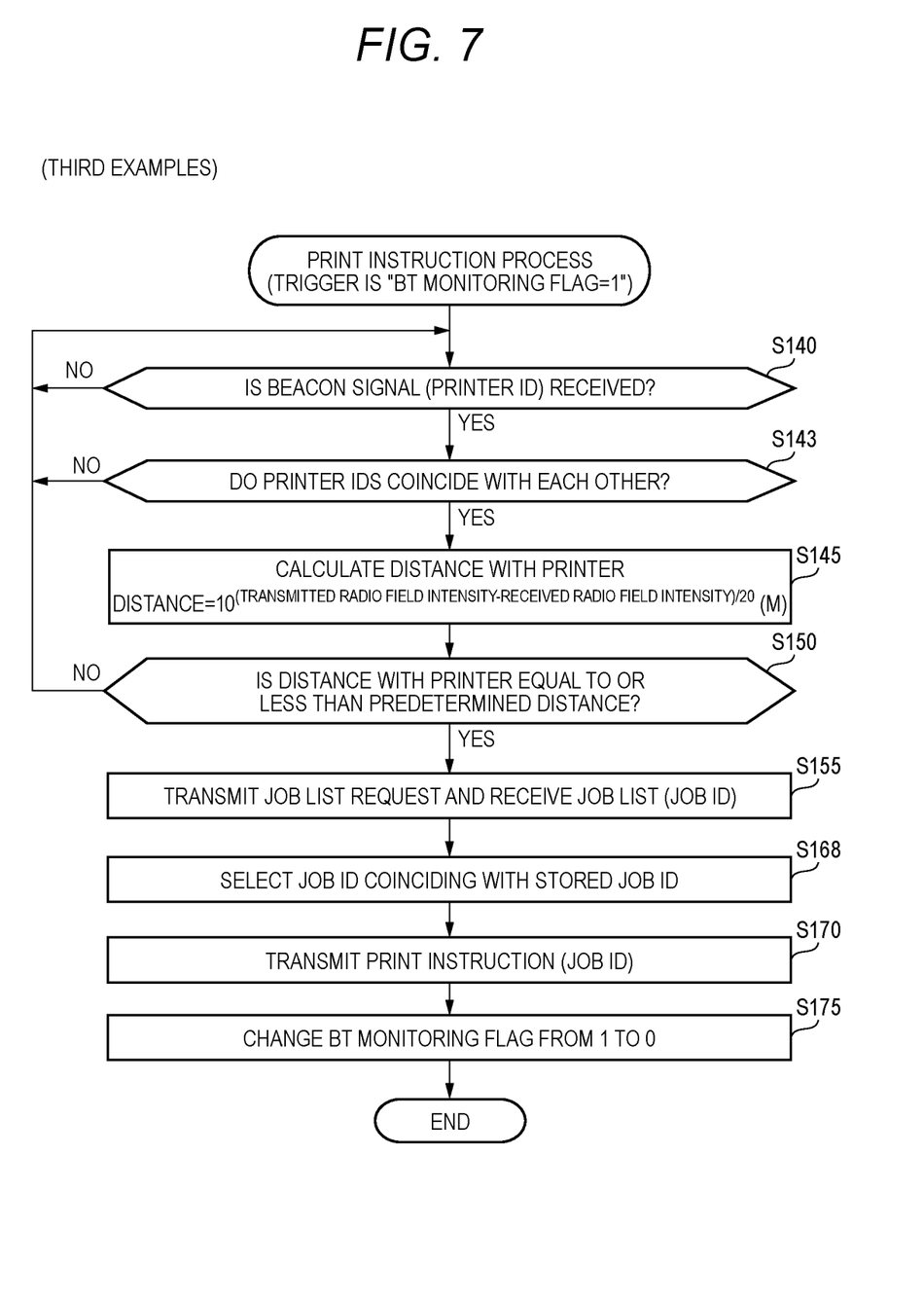
FIG. 7 illustrates a flowchart of a print instruction process of the third example.

(Print Instruction Process of Portable Terminal 10; FIG. 7)

A trigger of FIG. 7 is similar to the trigger of FIG. 3. S140 to S150 are similar to S40 to S50 of FIG. 3.

S155 is similar to S55 of FIG. 3. It is noted that the job list of the present example includes one or more job IDs related to one or more print jobs stored in the target printer, but does not include one or more file names.

In S168, the CPU 32 selects the job ID in the memory 34 stored in S28 of FIG. 2 from the one or more job IDs in the received job list. S170 and S175 are similar to S70 and S75.

Figure 8:
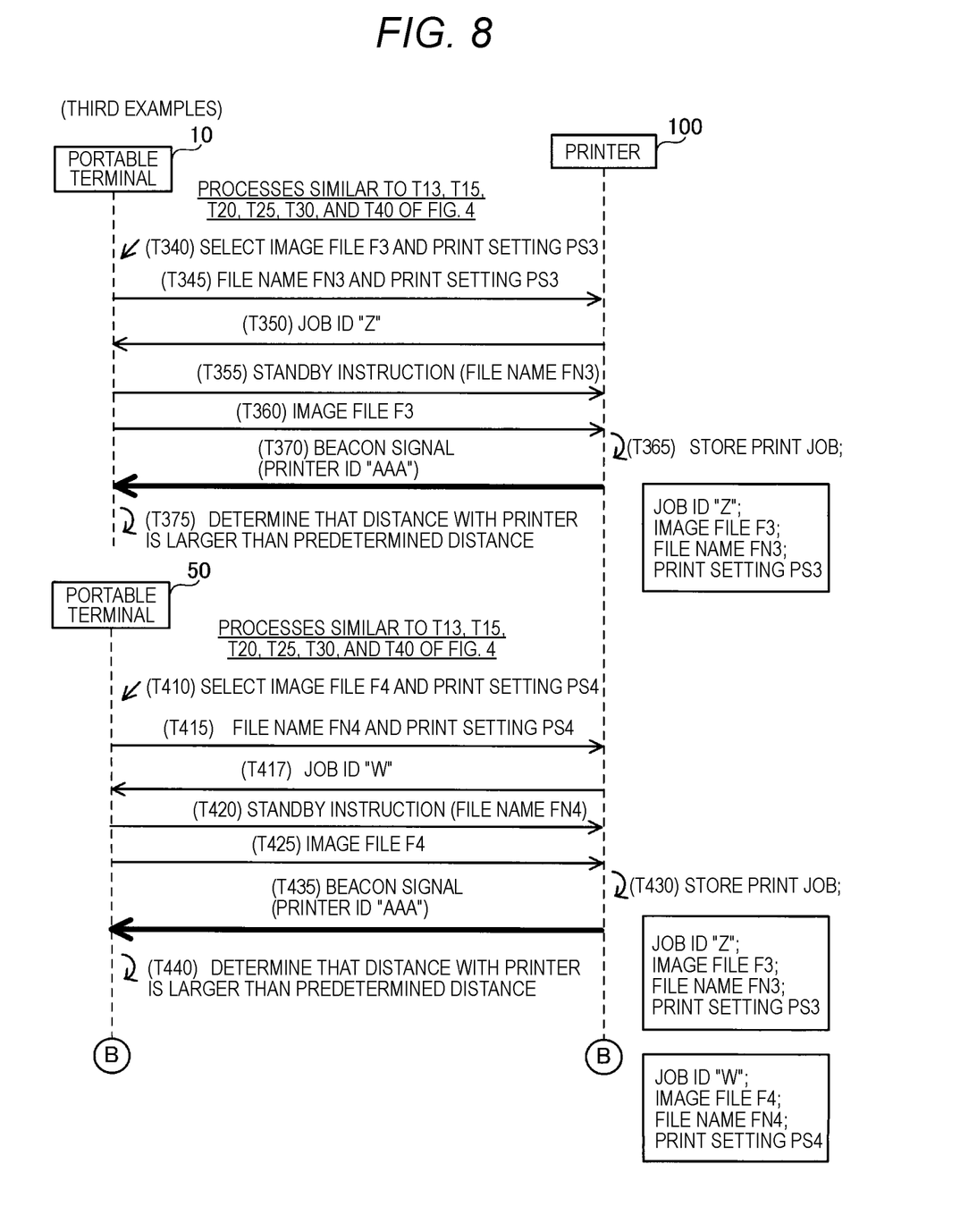
FIG. 8 illustrates a sequence diagram of the third example.

(Detailed Case; FIG. 8)

Subsequently, with reference to FIG. 8, detailed cases implemented by the processes of FIGS. 2 and 7 will be described. The portable terminal 10 performs processes similar to T13 to T40 of FIG. 4. T340 and T345 are similar to T45 and T50 of FIG. 4, except that an image file F3, print setting PS3, and a file name FN3 are used. In T350, the portable terminal 10 receives a job ID "Z", in which the file name FN3 and the print setting PS3 are associated with each other, from the printer 100, and stores the job ID "Z" (S28 of FIG. 2).

The portable terminal 10 transmits a standby instruction including the file name FN3 to the printer 100 in T355, and transmits the image file F3 to the printer 100 in T360. In T365, the portable terminal 10 stores a print job in which the job ID "Z", the image file F3, the file name FN3, and the print setting PS3 are associated with each other. T370 is similar to T70 of FIG. 4.

On the other hand, the portable terminal 50 also performs processes similar to T13 to T40 of FIG. 4. T410 to T440 are similar to T340 to T375, except that an image file F4, print setting PS4, a file name FN4, and a job ID "W" are used.

Figure 9:
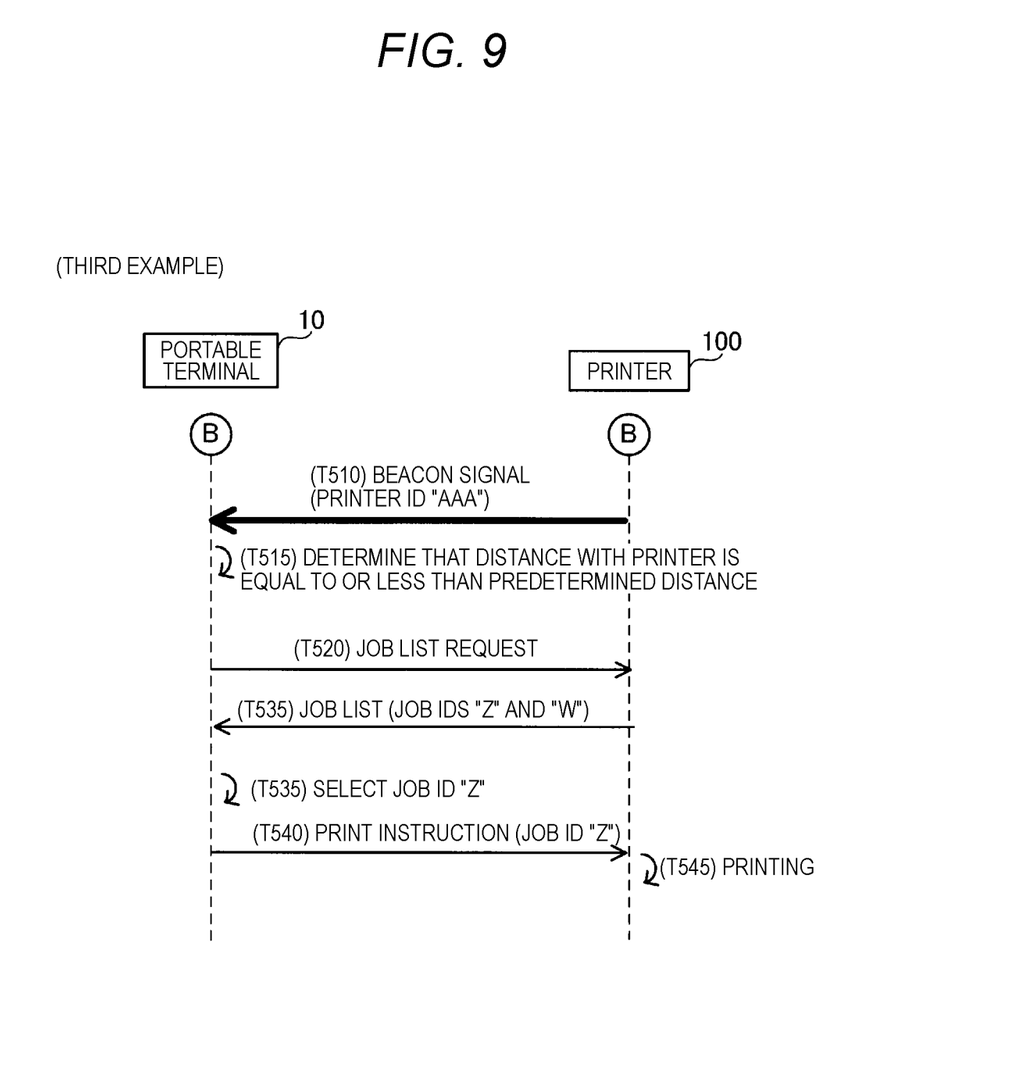
FIG. 9 illustrates a subsequent sequence diagram of FIG. 8.

T510 to T520 are similar to T110 to T120 of FIG. 5. In T535, the portable terminal 10 receives a job list including the job ID "Z" and the job ID "W" from the printer 100 (S155).

The portable terminal 10 selects the job ID "Z" stored in T350 from the two the job IDs "Z" and "W" in the received job list in T535 (S168), and transmits a print instruction including the job ID "Z" to the printer 100 in T540 (S170).

In T545, the printer 100 performs printing according to the image file F3 associated with the job ID "Z" by using the print setting PS3 associated with the job ID "Z" included in the print instruction. In the present example, since a user causes the printer 100 to perform printing according to the image file F4 after T545, it is highly probable that the portable terminal 50 will be approximate to the printer 100. Therefore, the printer 100 does not stop transmitting the Beacon signal. The printer 100 performs the printing according to the image file F4, and then stops transmitting the Beacon signal.

Effect of Present Example

According to the present example, when the distance between the printer 100 storing the two image files F3 and F4 and the portable terminal 10 is equal to or less than the predetermined distance (T515 of FIG. 9), the portable terminal 10 selects the job ID "Z" stored in the memory 34 of the portable terminal 10 (T535). Then, the portable terminal 10 transmits, to the printer 100, a print instruction for causing the printer 100 to perform printing according to the image file F3 associated with the job ID "Z" (T540). In this way, it is possible to allow the printer 100 to perform printing according to the image file F3, which is a part of the two image files stored in the printer 100 and is transmitted to and stored in the printer 100 by the portable terminal 10 (T545). In the present example, the portable terminal 50 is one example of an "apparatus different from the terminal device". The image files F3 and F4 are one example of "M image files". The job IDs "Z" and "W" are one example of M pieces of file information. The image file F3 is one example of "N image files". The image file F4 is one example of "(M-N) image files".

So far, detailed examples of the present invention have been described in detail, but these are only examples and do not limit the scope of the claims. The technology disclosed in the scope of the claims includes various modifications and changes of the detailed examples. The modification examples of the examples are as follows.

Modified Example 1

In a detailed case of each example, the printer 100 stores two image files; however, in the modification example, the printer 100 may store three or more image files. In this case, the portable terminal 10 may select two or more job IDs of three or more job IDs. That is, "M" may be an integer equal to or more than 2, and "N" maybe an integer equal to or more than 1 and smaller than M.

Modified Example 2

The printers 100 and 200 may be adjusted such that transmitted wave intensities of the Beacon signals in the printers 100 and 200 become equal to each other. In this case, the CPU 32 of the portable terminal 10 may store in advance a predetermined received radio field intensity corresponding to a predetermined distance stored in the memory 34, or instead of S45 and S50 of FIG. 3, the CPU 32 of the portable terminal 10 may determine whether the received radio field intensity of the Beacon signal is equal to or less than the predetermined received radio field intensity in the memory 34, thereby determining whether a distance with the target printer is equal to or less than the predetermined distance. That is, the "calculation process" can be omitted.

Modified Example 3

In S45 of FIG. 3 and S145 of FIG. 7, the CPU 32 of the portable terminal 10, for example, may calculate a difference between a transmitted radio field intensity and a received radio field intensity instead of the distance between the portable terminal 10 and the printer. Then, in S50 of FIG. 3 and S150 of FIG. 7, the CPU 32 may determine whether the calculated difference is equal to or less than a predetermined difference. That is, the "target value", for example, may be the difference between the transmitted radio field intensity and the received radio field intensity.

Modified Example 4

In the each example, instead of the printer ID, for example, an IP address assigned to a printer may be used. In general, the "printer information" may be information for identifying printers.

Modified Example 5

In the modification example, in S15 of FIG. 2, the CPU 32 may not store the printer ID in the memory 34 and the Beacon signal may not include the printer ID. In this case, S43 of FIG. 3 and S143 of FIG. 7 are omitted. That is, the "first storage control process" can be omitted.

Modified Example 6

In S30 of FIG. 2, the CPU 32 may not transmit the standby instruction to the target printer. In this case, even though an image file is received, an operation mode for waiting printing may be set in the target printer in advance. That is, the "standby instruction transmission process" can be omitted.

Modified Example 7

Each of the devices 10, 50, 100, and 200 may not include the BT I/F. In this case, for example, in S40 of FIG. 3 and S140 of FIG. 7, the CPU 32 receives a Beacon signal, which is transmitted according to the Wi-Fi system, via the Wi-Fi I/F 20 instead of a Beacon signal which is transmitted according to the BT system. That is, the "second communication interface" can be omitted.

Modified Example 8

Each of the devices 10, 50, 100, and 200 may include an I/F for performing radio communication according to a communication system (for example, a WFD (Wi-Fi Direct) system), which is different from the Wi-Fi system, instead of the Wi-Fi I/F. That is, the "first communication interface" is not limited to the Wi-Fi I/F 20, and may be an I/F for performing radio communication according to other communication systems.

Modified Example 9

The "terminal device" is not limited to the portable terminal 10, and may be a stationary apparatus (for example, a desktop PC and the like). The "printer" is not limited to the "printer 100", and may be a multifunction peripheral and the like having a print function and other functions (for example, a scan function, a FAX function and the like).

Modified Example 10

In the third example, a user may input account information assigned to the user and may log in to the portable terminal 10 before the process of FIG. 2. In the present modification example, in S25, the CPU 32 further transmits the input account information to the target printer. In the present modification example, the print job further includes account information corresponding to a target image file, and the job list of S155 of FIG. 7 includes one or more pieces of account information instead of one or more job IDs. In S168, the CPU 32 selects account information, which is currently used for logging in to the portable terminal 10 (that is, corresponds to a user who is currently operating the portable terminal 10), from one or more pieces of account information in the received job list. Then, in S170, the CPU 32 transmits a print instruction including the selected account information to the target printer, instead of the job ID. In this way, it is possible to allow the printer 100 to perform printing according to an image file which corresponds to the user who is currently operating the portable terminal 10 among one or more image files stored in the target printer.

Modified Example 11

In each example, the CPU 32 of the portable terminal 10 executes a program (that is, software), so that the processes of FIGS. 2, 3, and 7 are performed. Instead of this, at least one of the processes of FIGS. 2, 3, and 7 may be implemented by hardware of a logic circuit and the like.

The technical elements described in the present specification or the drawings exhibit technical availability singly or in various combinations, and are not limited to combinations disclosed in the claims at the time of application. Furthermore, the technologies described in the present specification or the drawings simultaneously achieve a plurality of objects and achieving one of the objects has the technical availability.

What is claimed is:

1. A non-transitory computer-readable medium having instructions to control a printer to perform operations, the operations comprising:

receiving print data from a terminal device, the print data being an image data to be printed;

starting, in response to the receiving the print data, to repeatedly transmit a signal to calculate a distance between the printer and the terminal device, the signal including printer identification information identifying the printer;

receiving a specific instruction including print-data identification information identifying the print data and causing to start a print according to the print data that is already received in the receiving the print data, from the terminal device; and executing, in response to the receiving the specific instruction, the print according to the print data that is identified by the print-data identification information.

2. The non-transitory computer-readable medium according to claim 1, wherein, in the starting to repeatedly transmit the signal, the signal is a beacon signal, a destination of the signal being not specified.

3. The non-transitory computer-readable medium according to claim 1, the operations comprising:

storing, in response to the receiving the print data, the print data in a storage; and starting, in response to the storing the print data, to repeatedly transmit the signal to calculate the distance.

4. The non-transitory computer-readable medium according to claim 3, the operations comprising:

receiving a standby instruction from the terminal device, the standby instruction being an instruction for delaying execution of the print; and storing, in response to the receiving the standby instruction, the print data in the storage.

5. The non-transitory computer-readable medium according to claim 1, the operations comprising:

stopping, in response to completion of executing the print according to the print data, the transmission of the signal.

6. The non-transitory computer-readable medium according to claim 1, the printer comprising:

a Wi-Fi interface configured to perform radio communication according to a Wi-Fi system; and a Bluetooth interface configured to perform radio communication according to a Bluetooth system, wherein the print data is received via the Wi-Fi interface, wherein the signal to calculate the distance is transmitted via the Bluetooth interface, and wherein the specific instruction causing to start the print according to the print data is received via the Wi-Fi interface.

7. The non-transitory computer-readable medium according to claim 1, the operations comprising:

receiving a printer search signal from the terminal device;

transmitting, in response to the receiving the printer search signal, the printer identification information; and receiving, after the transmitting the printer identification information, the print data from the terminal device.

8. The non-transitory computer-readable medium according to claim 1, the operations comprising:

receiving, after the transmitting the signal, a job list request from the terminal device;

transmitting, in response to the receiving the job list request, a job list to the terminal device; and receiving, after the transmitting the job list, the specific instruction including job information identifying a job, from the terminal device.

9. The non-transitory computer-readable medium according to claim 1, the operations comprising:

transmitting the signal with incorporating a job list; and receiving, after the transmitting the signal with incorporating the job list, the specific instruction including job information identifying a job, from the terminal device.

10. A printer comprising:

a controller, wherein the controller controls the printer to perform:

receiving print data from a terminal device, the print data being an image data to be printed;

starting, in response to receiving the print data, to repeatedly transmit a signal to calculate a distance between the printer and the terminal device, the signal including printer identification information identifying the printer;

receiving, a specific instruction including print-data identification information identifying the print data and causing to start a print according to the print data that is already received in the receiving the print data, from the terminal device; and executing, in response to receiving the specific instruction, the print according to the print data that is identified by the print-data identification information.

11. The printer according to claim 10:

wherein, the signal repeatedly transmitted is a beacon signal, a destination of the signal being not specified.

12. The printer according to claim 10, wherein the controller controls the printer to perform:

storing, in response to receiving the print data, the print data in a storage; and starting, in response to storing the print data, to repeatedly transmit the signal to calculate the distance.

13. The printer according to claim 12, wherein the controller controls the printer to perform:

receiving a standby instruction from the terminal device, the standby instruction being an instruction for delaying execution of the print; and storing, in response to the receiving the standby instruction, the print data in the storage.

14. The printer according to claim 10, wherein the controller controls the printer to perform:

stopping, in response to completion of executing the print according to the print data, the transmission of the signal.

15. The printer according to claim 10, the printer comprising:

a Wi-Fi interface configured to perform radio communication according to a Wi-Fi system; and a Bluetooth interface configured to perform radio communication according to a Bluetooth system, wherein the print data is received via the Wi-Fi interface, wherein the signal to calculate the distance is transmitted via the Bluetooth interface, and wherein the specific instruction causing to start the print according to the print data is received via the Wi-Fi interface.

16. The printer according to claim 10, wherein the controller controls the printer to perform:

receiving a printer search signal from the terminal device;

transmitting, in response to the receiving the printer search signal, the printer identification information; and receiving, after the transmitting the printer identification information, the print data from the terminal device.

17. The printer according to claim 10,
wherein the controller controls the printer to perform:
receiving, after the transmitting the signal, a job list request from the terminal device;
transmitting, in response to the receiving the job list request, a job list to the terminal device; and
receiving, after the transmitting the job list, the specific instruction including job information identifying a job, from the terminal device.

18. The printer according to claim 10,
wherein the controller controls the printer to perform:
transmitting the signal with incorporating a job list; and
receiving, after the transmitting the signal with incorporating the job list, the specific instruction including job information identifying a job, from the terminal device.

* * * * *